Oct. 17, 1967 F. W. SCHNEBLE, JR., ETAL 3,347,724

METALLIZING FLEXIBLE SUBSTRATA

Filed Aug. 19, 1964 3 Sheets-Sheet 1

INVENTORS
FREDERICK W. SCHNEBLE, JR.
JOSEPH POLICHETTE
EDWARD J. LEECH
BY
MORGAN, FINNEGAN, DURHAM & PINE
ATTORNEYS

Oct. 17, 1967 F. W. SCHNEBLE, JR., ET AL 3,347,724

METALLIZING FLEXIBLE SUBSTRATA

Filed Aug. 19, 1964 3 Sheets-Sheet 2

INVENTORS
FREDERICK W. SCHNEBLE, JR.
JOSEPH POLICHETTE
EDWARD J. LEECH
BY
MORGAN, FINNEGAN, DURHAM & PINE
ATTORNEYS

INVENTORS
FREDERICK W. SCHNEBLE, JR.
JOSEPH POLICHETTE
EDWARD J. LEECH
BY
MORGAN, FINNEGAN, DURHAM & PINE
ATTORNEYS 3,347,724

METALLIZING FLEXIBLE SUBSTRATA

Frederick W. Schneble, Jr., Oyster Bay, Joseph Polichette, South Farmingdale, and Edward J. Leech, Locust Valley, N.Y., assignors to Photocircuits Corporation, Glen Cove, N.Y., a corporation of New York Filed Aug. 19, 1964, Ser. No. 390,623
19 Claims. (Cl. 156—151)

ABSTRACT OF THE DISCLOSURE

A process for producing metallized flexible insulating base materials by dispersing an agent catalytic to the reception of electroless metal in a resinous adhesive, adhering the resinous adhesive to the flexible base material, and subsequently contacting the resulting flexible base material with an electroless metal solution capable of autocatalytically depositing ductile metal. The metallized flexible products produced by this process may be readily bent, twisted, flexed, etc., without cracking the ductile metal deposit or breaking its bond to the base material, and are useful as flexible printed circuit panels.

This invention relates to metallizing insulating substrata or supports and to the products resulting from such methods.

More particularly, the present invention relates to imposing by chemical means bright, strongly adherent, rugged and ductile metal deposits on flexible insulating supports, and to the products which result from such methods.

Although applicable whenever it is desired to strongly adhere a metal coating or deposit of the type described to a flexible insulating base as, for example, for decorative effect, the procedures for metallization disclosed herein are particularly useful for making flexible printed circuits from cheap, low-grade, readily available flexible electrical insulating base materials or flexible base materials coated with electrical insulating materials.

The terms flexible insulating substrata or laminates as used herein refer to plastic or resinous materials capable of being flexed, bent, turned, bowed or twisted, without breaking. These terms include materials which are plastic and yield to pressure, but are to be distinguished from plastic or resinous materials which are stiff or brittle and crack or otherwise break or fracture when they are flexed, bent, turned, bowed or twisted.

It is an object of this invention to provide improved methods for imposing uniform, rugged, firmly adherent, bright ductile electroless deposits of metal on flexible insulating surfaces.

It is another object of this invention to provide improved methods for imposing uniform, rugged, firmly adherent bright ductile electroless deposits of copper on flexible insulating surfaces.

Another object of this invention is to provide methods for electrolessly metallizing flexible insulating supports in an economical manner which lends itself readily to mass production techniques.

Still a further object of this invention is to impose predetermined patterns of uniform, rugged, firmly adherent, bright, ductile deposits of electroless metal on flexible insulating surfaces.

Another object of the invention is to provide improved printed circuit patterns having plated through holes.

Still a further object of this invention is to provide methods for producing compact, composite or stacked assemblies of electrolessly metallized, flexible insulating surfaces.

Still a further object of the invention is to provide methods for producing compact, multilayer printed circuit patterns.

An additional object of this invention is to provide improved multilayer printed circuit assemblies having plated through holes.

Further objects of the invention include the products produced by the aforesaid methods.

Other objects and advantages of the invention will in part be set forth and will in part be obvious herefrom or may be learned by practice with the invention.

Figure 1:
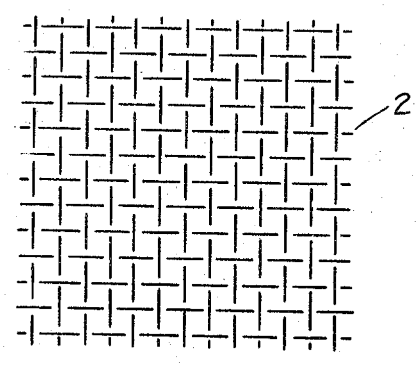
FIGURE 1 is a plan view of a flexible, foraminous insulating sheet which may be metallized in accordance with the teachings contained herein.

According to this invention, a process for metallizing flexible insulating surfaces is provided which comprises providing an insulating flexible base material with adhesively bound, finely divided, solid particles of an agent catalytic to the reception of electrolessly deposited metal, and then subjecting the resulting flexible base material to an electroless metal bath to auto-catalytically deposit metal which is both rugged and ductile on designated portions of the base material.

Products can be made from the processes of the type described which may be readily bent, rolled, and/or folded without breaking or cracking the metal deposit or rupturing its bond to the substratum.

The term catalytic agent as used herein refers to an agent which is catalytic to the reduction of metal cations dissolved in electroless metal deposition baths of the type to be described. Such catalytic agents include nickel, cobalt, iron, steel, palladium, platinum, copper, brass, manganese, chromium, molybdenum, tungsten, titanium, tin, and silver, including certain salts thereof.

When the catalytic compositions and the electroless depositing baths described herein are employed in the manner and in the sequence to be described, there is produced on the base material a dense, uniform, ductile, bright, conductive metal deposit which is firmly and tenaciously adhered to the flexible base material or substrate.

When the catalytic adhesives and the electroless metal depositing baths disclosed are employed in making printed circuits, many advantages over the conventional commercial procedures are obtained. According to this process, metal is applied only where desired. No etching is required, and no copper is thrown away. The process is readily adaptable to mass production techniques. Additionally, the metal deposit forming the conductive pattern is ductile and bright, and its thickness can be controlled to close limits. The fact that the copper deposit is ductile is highly significant, since ductility of the metal pattern is necessary if durable flexible printed circuits are to be achieved. The conductor pattern produced herein is strongly resistant to both mechanical and thermal shock and can readily withstand both rough mechanical handling and soldering, including dip soldering. Additionally, the process is economical and requires a minimum amount of control. Further, the metal deposit can be applied on practically any flexible base material, regardless of size, shape or configuration, and can be subsequently readily coated or reinforced with other metals by electroless dip techniques or other procedures to impart special characteristics or properties to the circuits as a whole, or portions thereof. The electroless metal deposits also possess enhanced solderability characteristics, as compared to metal produced by other technique.

With the techniques described herein, uniform layers of ductile electroless metal of practically any desired thickness may be achieved. Usually, the metal deposit will range in thickness from about 0.1 mil. and 7 mils, or even higher.

The catalytic compositions to be used to impregnate or coat the flexible insulating supports used to prepare the flexible circuit boards comprise a flexible adhesive resin base having dispersed throughout finely divided particles of the catalytic agents of the type described above.

Preferably, the catalytic agents dispersed throughout the flexible resin or adhesive ink will be cheap, readily available, particulate, finely divided metal or metal oxides, such as titanium, aluminum, copper, iron, cobalt, zinc, titanous oxide, copper oxide, and mixtures of the foregoing.

Particularly good results are achieved when the receptive agent is cuprous oxide and this material is preferred for use. Cuprous oxide is itself an exceptionally good insulator of electricity. Additionally, when reduced, as by treatment with an acid, the cuprous oxide may be changed to metallic copper to initially form the conducting portion of the desired printed circuit design which may then be further built up by electroless deposition, as by immersing or otherwise treating with the electroless metal depositing baths to be disclosed.

The catalytic compositions of the present invention may take a variety of forms.

For example, the insulating base members contemplated for use are most frequently formed of resinous material. When this is the case, the active agent disclosed herein, e.g., copper oxide, in finely divided form, may be incorporated into the resin by milling, calendering, or other conventional methods after which the resin is set to form the base.

Alternatively, a thin film or strip of unpolymerized resin having particles of the active agent suspended therein might be laminated to a resinous insulating base and cured thereon. In another form, the insulating base may comprise a laminate of paper or cloth sheets, e.g., woven fiberglass sheets, impregnated with a composition comprising particles of a catalytic agent suspended therein.

In still another embodiment, an ink comprising an adhesive resinous material having dispersed therein finely divided particles of the catalytic agent is printed on the surface of an insulating support and cured thereon.

Regardless of the manner in which it is incorporated in or on the base material, the catalytic agent is present in a finely divided form and preferably passes 200 mesh, U.S. Standard Sieve Series. Ordinarily, from a small fraction of 1% to about 80% of the active agent is admixed with adhesive resinous material to form the catalytic composition, but this concentration will depend to a large extent upon the materials used, and upon the time in which the catalytic compositions are allowed to remain in the electroless plating bath.

The resins into which the catalytic agents are dispersed are non brittle or high-peel strength adhesives commonly referred to as resinous alloys. Such systems generally comprise, in combination, a thermosetting resin and a flexible adhesive resin. Typical of the thermosetting resins may be mentioned oil soluble phenolic type resins, such as fusible copolymers of phenol, resorcinol, a cresol, or a xylenol with an aldehyde or with furfural. As the thermosetting resin may also be mentioned non-flexible epoxy resins, such as the reaction product of epichlorohydrin with bisphenol A. Typical of the flexible adhesive resins are the flexible epoxy resins, polyvinyl acetal resins, polyvinyl alcohol, polyvinyl acetate, and the like. As the adhesive resin may also be mentioned chlorinated rubber and butadiene acrylonitrile copolymers.

The adhesive resins of the type described have appended thereto polar groups, such as nitrile, epoxide, acetal, and hydroxyl groups. Such adhesive resins copolymerize with and plasticize the thermosetting resins, and impart good adhesive characteristic through the action of the polar groups.

The thermosetting resin portion of the composition is required in order to afford resistance to heat upon soldering, and also to protect against decomposition when subjected to the electroless metal solutions. A thermosetting resin alone, however, will not ordinarily have adequate tackiness or sufficient flexibility to resist heat shock and the bending forces to which the flexible circuits of this invention will be subjected; and would have negligent resistance to peeling of long conductor patterns from the surface. Admixture of adhesive resins such as those disclosed overcome the deficiencies of the thermosetting resins, and together, the thermosetting and adhesive resins provide an especially suitable composition for carrying the catalytic agents and for incorporating them over or in the flexible substratum.

Particularly suitable for use as the adhesive resin for certain substrates is a combination of a phenolic type resin and an adhesive or flexible epoxy resin. The most common epoxy resins for use in the resinous composition are copolymers of epichlorohydrin (1-chloro-2,3,-epoxy propane) with bisphenol A (2,2,-p-hydroxy phenyl propane) which have melting points within the range of 20° F. to 375° F. and molecular weights of about 350 to 15,000.

Although epichlorohydrin is the most important organic epoxide employed in the formation of the epoxy resins, other epoxides such as, for example, 1,2,3,4-diepoxy butane may be used. Similarly, epoxy resins derived from phenols other than bisphenol A are suitable for use. Such resins include, for example, the reaction product of epichlorohydrin with resorcinol, with phenols derived from cashew nut oils, with hydroquinone, with 1,5-dihydroxy napthalene or with 2,2,5,5-tetrabis-(4-hydroxy phenyl) hexane. Phenolic intermediates of the resol type, hydrazines and sulfonamides, such as, for example, 2,4-toluene disulfonamide, may also be used for reaction with an organic epoxide to produce epoxy resins suitable for use. Aliphatic epoxy resins are also suitable. Such resins are, for example, the reaction product of epichlorohydrin with glycerol, with ethylene glycol or with pentaerythritol.

The phenolic type resin may be a copolymer of a phenol, resorcinol, a cresol or a xylenol with an aldehyde or with furfural. Thus, it may be a copolymer of phenol or a substituted phenol with formaldehyde or a formaldehyde-yielding material, such as, paraformaldehyde or hexamethylene tetraamine. The phenolic resin is preferably of the oil soluble type. As examples of thermosetting phenolic type resins which may be used may be mentioned copolymers of formaldehyde with p-cresol, p-ethyl phenol, p-tert butyl phenol, p-tert amyl phenol, p-tert octyl phenol, p-phenyl phenol, diisobutyl phenol, or a bisphenol, such as 4,4-isopropylidene diphenol or 2,2-bis(p-hydroxy phenyl) propane. It may be of the modified type, such as, for example, one which has been modified with copal or rosin to cause it to be oil soluble.

The phenolic type resins are, themselves, curing agents for the epoxy resins, and even those which are, themselves, permanently fusible form a tough, adherent film in combination with an epoxy resin which is probably the result of a cross-linking between the epoxy resin and the phenolic type resin. However, the resinous compositions may contain an additional curing agent. This curing agent may be another resin, such as, for example, a polyamide resin or a melamine-formaldehyde resin, or it may be, for example, a dibasic acid, such as, for example, phthalic anhydride, an amine, such as, for example, triethanolamine, diethylene triamine or metaphenylene diamine, or an amide, such as, for example, dicyandiamide.

Preferred non-brittle or high peel-strength adhesives for use are neoprene-phenolics, nitrile-phenolics, vinyl formal phenolics, vinyl butyrol-phenolics, nylon-phenolics, and modified epoxies, e.g., epoxies formulated by the use of polymeric curing agents or by alloying with polymeric film-formers, such as polysulfides, nylon, and alkyds. The active agent, it should be clear, is incorporated into the resinous compositions in such a way that the agent is dispersed throughout the resin, and present in the resin, upon solidification, at numerous individual sites. Because of this dispersion, the particles of the receptive agents are not in contact with one another and accordingly, the catalytic compositions disclosed herein are nonconducting. Of course, when the active agent is itself nonconducting, such as cuprous oxide, or titanous oxide, this factor is not important. When metals such as copper, iron, and so forth, are employed as the active agent, however, the dispersion of the active particles throughout the resin becomes important. Were conducting particles to be incorporated into the catalytic compositions in such a manner that they were in intimate contact with one another, it would be impossible to prepare printed circuits from such compositions using the so-called reverse method. In this method, the catalytic composition would be adhered to the overall surface of the base material or the base material would itself constitute the catalytic composition, and selected portions thereof would then be masked, leaving exposed the conductor pattern. The base would then be immersed in the electroless copper bath to deposit copper on the exposed areas. Were the catalytic composition employed conductive, leakage would occur between the lines of the conductor pattern through the catalytic composition. Obviously, such a situation could not be tolerated.

When large amounts of the active agent are employed, as compared to the resin, relatively small amounts of resin bind the uppermost or surface particles of the active agent. Accordingly, electroless metal can readily deposit on the active agent on the surface. When small amounts of the active agent are employed in comparison to the resin, e.g., 0.25 to 10% by weight, it may be that the active agent at the surface of the catalytic composition will be completely coated by the resinous material. In this situation, it may be necessary to treat the surface as by treatment with solvent, abrasion and the like, to expose the particles piror to contact with the electroless plating bath. If, in this embodiment the particles are not preexposed, it will be necessary to contact the surface to the electroless plating bath for several hours before the initial copper deposit will form.

When copper oxide is used, it is preferably to activate the cuprous oxide by treatment with an acid, to convert at least a portion of the cuprous oxide particles at the surface of the ink to copper. Preferred for use is sulfuric acid. Other reducing agents which are acceptable include aqueous solutions of phosphoric acid, acetic acid, sulfuric acid, hydrofluoric acid, hypophosphites, and the like. Nitric acid may also be used but it is not quite as desirable as the others since it dissolves the copper formed at a rather high rate. Alkaline formaldehyde solutions including the electroless copper baths disclosed herein will also reduce the cuprous oxide.

Among the wide variety of adhesives which may be used when it is desired to prepare the catalytic compositions in the form of inks are those compositions disclosed in U.S. Patent Nos. 2,532,374 and 2,758,953. In this embodiment, the receptive agent, as will be clear, is imparted into the adhesive base in such a way that the receptive agent is dispersed throughout the base medium, and present in the base medium at numerous individual sites.

Typical examples of catalytic inks suitable for use in printing conductor patterns on an insulating base are given below:

*Example 1*

| | G. |
|---|---|
| Xylene | 50 |
| Diacetone alcohol | 75 |
| Parlon 10 cps. | 50 |
| Phenol-formaldehyde (oil soluble) | 10 |
| Butadiene-acrylonitrile rubber | 20 |
| Cab-O-Sil | 3 |
| Cuprous oxide | 70 |

*Example 2*

| | G. |
|---|---|
| Butadiene-acrylonitrile rubber | 15.5 |
| Diacetone alcohol | 72 |
| Nitromethane | 72 |
| Phenol-formaldehyde resin (oil soluble) | 7.5 |
| Cab-O-Sil | 4 |
| Ethanol | 3 |
| Parlon 10 cps. | 10 |
| Xylene | 50 |
| Cuprous oxide | 80 |

*Example 3*

| | G. |
|---|---|
| Butadiene-acrylonitrile rubber | 15.5 |
| Diacetone alcohol | 50 |
| Nitromethane | 50 |
| Phenol-formaldehyde resin (oil soluble) | 7.5 |
| Parlon 10 cps. | 3 |
| Toluene | 20 |
| Cab-O-Sil | 3 |
| Ethanol | 3 |
| Cuprous oxide | 60 |

*Example 4*

| | G. |
|---|---|
| Butadiene-acrylonitrile rubber | 15.5 |
| Diacetone alcohol | 50 |
| Nitromethane | 50 |
| Phenol-formaldehyde resin (oil soluble) | 7.5 |
| Cab-O-Sil | 3 |
| Ethanol | 3 |
| Cuprous oxide | 60 |

*Example 5*

| | G. |
|---|---|
| Toluene | 50 |
| Diacetone alcohol | 50 |
| Butadiene-acrylonitrile rubber | 10.5 |
| Phenol-formaldehyde resin (oil soluble) | 7.5 |
| Parlon 10 cps. | 5 |
| Ethanol | 5 |
| Cab-O-Sil | 6 |
| Cuprous oxide | 50 |

*Example 6*

| | G. |
|---|---|
| Epoxy resin | 15 |
| Butadiene-acrylonitrile rubber | 15 |
| Diacetone alcohol | 50 |
| Toluene | 50 |
| Phenol-formaldehyde resin (oil soluble) | 11 |
| Cuprous oxide | 60 |

In the above examples, Parlon is a chlorinated rubber from Hercules Powder Company. The epoxy resin of Example 6 is DER 332, sold by Dow Chemical Company, and is the reaction product of epichlorohydrin and bisphenol A. It has an epoxy equivalent of 173 to 179, an average molecular weight of 340 to 350 and a viscosity at 25° C. of 3600 to 6400. Cab-O-Sil is a tradename for a colloidal silica.

To prepare the coating compositions or inks disclosed in Examples 1 to 6, the resins are dissolved in the solvents and milled with the pigments on a three roll mill.

The viscosity of compositions having the formulae of Examples 1 to 6 will ordinarily vary between about 5 to 100 poises at 20° C.

The catalytic inks may be applied to the flexible base in any convenient manner. For example, when a direct process for making printed circuits is employed, the circuit pattern of the ink may be imposed on the insulating base by screen printing or offset printing techniques. When the reverse process is employed, the insulating base may be coated with the catalytic ink, as by dipping, spraying, calendering, and the like, and then portions thereof masked to leave exposed the conductor pattern. When the catalytic inks are used to produce plated through holes, the ink may be drawn into the holes by vacuum. Alternatively, the pierced base material may be dipped into the inks, and then vibrated to remove excess ink from the holes. Alternatively, suitable printing devices may be used to print the ink directly on the insulating surfaces surrounding the holes, or on at least a portion of such surfaces.

After treatment of the base with the catalytic ink, the adhesive base of the ink may be partially or fully cured by heating, thereby firmly bonding the adhesive ink with its contained receptive agent to the insulating base member.

The insulating base materials used to make the printed circuits must be able to withstand the temperatures which will be encountered in processing and in use. Preferable for use as flexible insulating base materials are thin sheets comprising resins such as phenol-formaldehyde, melamine-urea, vinyl acetate-chloride copolymer, rubber, epoxy resin polymers, fiberglass sheets, acrylonitrile-butadiene-styrene, and the like, including flexible, porous or foraminous cloth or paper sheets impregnated with such resinous materials.

Copper oxide constitutes a preferred catalytic agent for use herein because of its exceptionally good insulation properties. When ink or resin containing cuprous oxide is subjected to a reducing agent, such as sulfuric acid, a portion of the cuprous oxide in contact with the reducing agent is converted to metallic copper, which in turn serves as an especially active catalytic site for electroless metal deposition. The cuprous oxide which does not contact the reducing agent remains unreduced and serves as an effective insulator to prevent leakage between the conductor patterns.

Typically, the autocatalytic or electroless metal deposition solutions for use herein will comprise an aqueous solution of a water soluble salt of the metal or metals to be deposited, a reducing agent for the metal cations, and a complexing or sequestering agent for the metal cations. The function of the complexing or sequestering agent is to form a water soluble complex with the dissolved metallic cations so as to maintain the metal in solution. The function of the reducing agent is to reduce the metal cation to metal at the appropriate time, as will be made more clear hereinbelow.

For ductile deposits, a small effective amount of a cyanide compound should be added to the electroless metal solutions.

As the cyanide compound may be mentioned alkali cyanides, such as sodium and potassium cyanide, and nitriles such as chloroacetonitrile, alpha-hydroxy nitriles, e.g., glycolnitrile and lactonitrile, and dinitriles, e.g., succinonitrile, iminodiacetonitrile, and 3,3′ iminodipropionitrile.

The amount of cyanide compound will ordnarly range between about 5 micrograms and 500 milligrams per liter.

Care should be employed in adding the cyanide compounds to insure that an excess is not employed. Too much cyanide compound is deleterious and will cause the solution to cease functioning. The water soluble sulfates, chlorides, acetates, and nitrates of the metals to be deposited will ordinarily be utilized as the water soluble salts.

The reducing agents in such metal deposition baths include borohydrides, amine boranes, formaldehyde, and the like.

The borohydride reducing agent may consist of any water soluble borohydride having a good degree of solubility and stabliity in aqueous solutions. Sodium and potassium borohydrides are preferred. In addition, substituted borohydrides in which not more than 3 hydrogen atoms of the borohydride ion have been replaced can be utilized. Sodium trimethoxy borohydride, $NaB(OCH_3)_3H$, is illustrative of the compounds of this type.

Also may be mentioned ammonium borohydride and the amine boranes, such as isopropylamine borane.

In addition to formaldehyde, polymers of the formaldehyde, e.g., paraformaldehyde, may be used as the reducing agent. Also suitable as the reducing agent is alpha-trioxymethylene.

The sequestering or complexing agent will be selected to form a strong complex with the metal ions to prevent the precipitation of metal or metallic salts. The complexing agent selected should also be capable of forming a metal complex which is soluble in the plating solution, and also which is sufficiently stable so that it will not react with the reducing agent in the main body of the plating solution, but only at or in the near vicinity of the catalytic surface.

The complexing or sequestering agents suitable for use in accordance with this invention include ammonia and organic complex-forming agents containing one or more of the following functional groups: primary amino group ($-NH_2$), secondary amino group ($>NH$), tertiary amino group ($>N-$), amino group ($=NH$), carboxy group ($-COOH$), and hydroxy group ($-OH$). Among such agents may be mentioned ethylene diamine, diethylene triamine, triethylene tetramine, ethylenediamine tetraacetic acid, citric acid, tartaric acid, and ammonia. Related polyamines and N-carboxymethyl derivatives thereof may also be used.

Rochelle salts, the sodium salts (mono-, di-, tri-, and tetrasodium) salts of ethylenediamine tetraacetic acid, nitrilotriacetic acid and its alkali salts, gluconic acid, gluconates, and triethanolamine are preferred as complexing agents, but commercially available glucono-δ-lactone and modified ethylenediamineacetates are also useful, and in certain instances give even better results than the pure sodiu methylenediaminetetraacetates. One such material is N-hydroxyethylethylenediaminetriacetate. Other materials suitable for use as complexing agents are disclosed in U.S. Patent Nos. 2,995,408, 2,938,805, 3,075,855 and 3,075,856.

In preparing the electroless metal deposition baths, it is desirable to combine the bath ingredients in such a manner as to avoid reaction between the soluble metal salt and the reducing agent.

The quantities of the various ingredients in the baths of this invention are subject to wide variation. Typically, however, the bath constituents will be as follows:

| | |
|---|---|
| Water soluble metal salt | 0.002 to 0.60 mole/l. |
| Reducing agent | 0.002 to 2.5 moles/l. |
| Complexing agent | 0.5 to 10 times the moles of metal salt. |
| Cyanide compound | 0.00002 to 0.06 mole/l. |

The amount of sequestering agent to be added to the plating solution depends upon the nature of the sequestering agent and the amount of the metal salt present in the bath. In alkaline solutions, the preferred ratio of the metal salt to complexing agent lies between about 1:3 and 1:10. A small excess of the sequestering agent, based upon the metal salt, generally is advantageous.

It should be understood that as the baths are used up in plating, the metal salt, and the reducing agent may be replenished from time to time, and also that it may be advisable to monitor the pH, and the cyanide content of the bath, and to adjust them to their optimum value as the bath is used.

For best results, surfactants in an amount of less than about 5 grams per liter are added to the baths disclosed herein. Typical of suitable surfactants are organic phosphate esters, and oxyethylated sodium salts. Such surfactants may be obtained under the tradenames Gafac RE 610 and Triton QS–15, respectively.

The baths are ordinarily used at temperatures between 25° and 70°C., although they may be used at lower temperatures or at even higher temperatures. As the temperature is increased, it is usual to find that the rate of plating is increased.

With the baths disclosed, metal deposition occurs autocatalytically at a uniform rate wherever there is contact between the catalytic surface being plated and the plating solution. There is no substantial variation in the plate thickness oven for the most complicated shapes. Thus, metal may be uniformly deposited in recesses, as well as on exposed parts of the objects being plated, and there is no build-up of coating at points or edges. These conditions are difficult or impossible to achieve by electroplating. Because of the uniform deposition achieved, the plating process described is particularly suitable for plating objects of irregular or complicated shapes which are difficult or impossible to metallize by conventional techniques.

Although the utilization of electroless deposits of ductile metal is generally contemplated, the invention will be particularly described with reference to the deposit of the Group I metals as exemplified by ductile copper.

The baths to be described herein will ordinarily deposit a coating of electroless copper of a thickness of about 1 mil., within between about 10 and 100 hours, depending on the composition, pH, temperature, and related factors.

Examples of the electroless copper depositing baths suitable for use will now be described.

*Example 7*

| | Moles/l. |
|---|---|
| Copper sulfate | 0.03 |
| Sodium hydroxide | 0.125 |
| Sodium cyanide | 0.0004 |
| Formaldehyde | 0.08 |
| Tetrasodium ethylenediaminetetraacetate | 0.036 |
| Water | Remainder |

This bath is preferably operated at a temperature of about 55° C., and will deposit a coating of ductile electroless copper about 1 mil. thick in about 51 hours.

Other examples of suitable baths are as follows:

*Example 8*

| | Moles/l. |
|---|---|
| Copper sulfate | 0.02 |
| Sodium hydroxide | 0.05 |
| Sodium cyanide | 0.0002 |
| Trisodium N-hydroxyethylethylenediaminetriacetate | 0.032 |
| Formaldehyde | 0.08 |
| Water | Remainder |

This bath is preferably operated at a temperature of about 56° C., and will deposit a coating of ductile electroless copper about 1 mil. thick in about 21 hours.

*Example 9*

| | Moles/l. |
|---|---|
| Copper sulfate | 0.05 |
| Diethylenetriamine pentaacetate | 0.05 |
| Sodium borohydride | 0.009 |
| Sodium cyanide | 0.008 |
| pH | 13 |
| Temperature | 25° C. |

*Example 10*

| | Moles/l. |
|---|---|
| Copper sulfate | 0.05 |
| N-hydroxyethylethylenediaminetriacetate | 0.115 |
| Sodium cyanide | 0.0016 |
| Sodium borohydride | 0.008 |
| pH | 13 |
| Temperature | 25° C. |

The manner in which the invention can be carried out will be clear by reference to the accompanying drawings.

Figure 2:
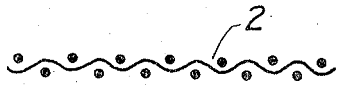
FIGURE 2 is a cross-section of the foraminous sheet of FIGURE 1.
Figure 3:
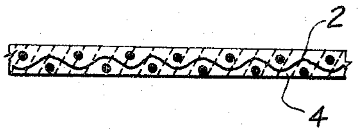
FIGURE 3 is a cross-section showing the flexible foraminous sheet of FIGURE 1 following impregnation with a catalytic ink.
Figure 4:
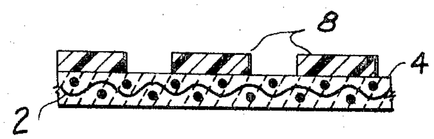
FIGURE 4 is a cross-section of the foraminous sheet following impregnation with a catalytic ink and printing with a mask.
Figure 5:
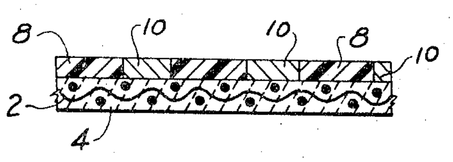
FIGURE 5 is a cross-section of the foraminous sheet on which ductile electroless metal has been deposited on the surface portions of the flexible base not covered by the mask to produce a predetermined circuit pattern.

According to one embodiment, a flexible foraminous substratum, e.g., a woven fiberglass sheet, such as is shown at 2 in FIGURES 1 and 2 is impregnated with a catalytic ink of the type described supra. FIGURE 3 depicts the flexible substratum following impregnation with the catalytic ink 4. Next, there is printed on the impregnated substratum a resist indicated generally at 8, FIGURE 4, which masks out the circuit design which it is desired to form.

If necessary, the substratum may next be treated to activate the catalytic ink as described above, and then the resulting substratum is immersed in an electroless metal plating bath of the type described to deposit ductile copper tenaciously at 10 in those areas not covered by the resist to form a predetermined circuit pattern.

Figure 6:
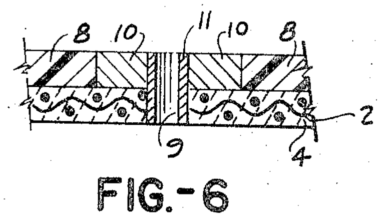
FIGURE 6 is a cross-section of an embodiment of the invention provided with conducting cross-overs or plated through holes.

If desired, holes or apertures may be provided in the flexible laminate to provide through connections between the circuit pattern layers, as shown in FIGURE 6 at 9. Such holes will ordinarily be provided following impregnation with the catalytic ink, as by drilling, punching, or the like. It will be noted that the walls surrounding the holes in the impregnated laminate shown in FIGURE 6 will be catalytic to the deposition of electroless copper. Electroless metal 11 (FIGURE 6) may therefore be deposited on the lateral walls surrounding the aperture 9, simultaneously with deposition of the electroless metal forming the surface conductor pattern 10.

When multilayer circuits are desired, a plurality of panels prepared as indicated in FIGURES 1–5 may be formed. The individual panels may then be placed in registry or otherwise stacked and then bonded together as by lamination under heat and pressure.

Figure 7:
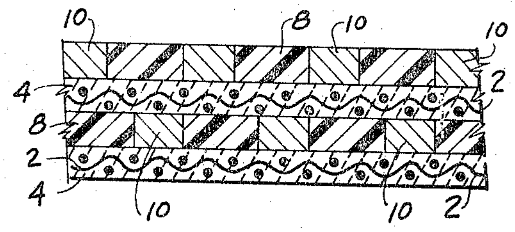
FIGURES 7 to 9 are cross-sections of various multilayer embodiments of the invention.
Figure 8:
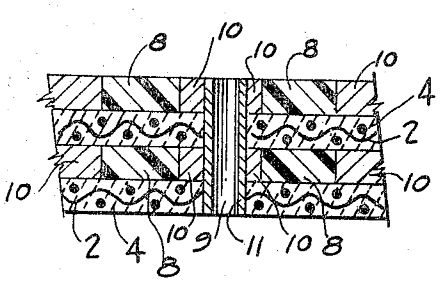

Such a multilayer product is shown in FIGURE 7. The multilayer product of FIGURE 7 is prepared by laminating together under heat and pressure at least two of the panels shown in FIGURE 5. In FIGURE 7, the reference numerals 2 indicate separate, flexible insulating base materials impregnated with catalytic ink 4. Reference numeral 10 indicates the areas of the conducting metal formed as described hereinabove, and numeral 8 refers to the insulating mask. FIGURE 8 shows a multilayer flexible panel provided with plated through holes. The composite or structural assembly of FIGURE 8 may be made by superimposing or stacking two of the panels shown in FIGURE 6 in registry, and then laminating under heat and pressure.

In drilling or punching holes in laminates of the type described, loose particles of the catalytic agent tend to be pried loose from the hole wall during the drilling or punching operation. The walls should therefore be cleaned to remove such particles prior to subjecting the laminates to electroless metal deposition.

It will readily be appreciated that plated through holes or conducting passageways between the top and bottom surfaces of the flexible insulating panels of this invention may readily be obtained. Thus, when the flexible substrata or support is porous or foraminous in nature, the catalytic ink impregnated provides catalytic sites throughout the entire base or substratum so that when holes are drilled through the substratum the walls surrounding the holes automatically are provided with catalytic active sites for the reception of electroless metal. Similar results occur when the flexible support is molded from a resin having dispersed therein the catalytic particles.

Thus, for example, when holes are drilled in a woven fiberglass cloth impregnated with the catalytic inks described herein, the walls surrounding the holes are automatically activated for reception of electroless copper. All that has to be done therefore is for the flexible substratum to be subjected to the electroless metal deposition bath, to form electroless metal on the walls surrounding the holes. It will readily be appreciated that this presents a facile technique for forming plated through holes as compared to the techniques heretofore available.

When the flexible support is not porous or foraminous, it will generally be necessary in making plated through holes to coat the walls of the holes with the catalytic ink, or otherwise sensitize such walls, if a deposit of electroless copper is desired on the walls surrounding the holes.

A particularly suitable method for coating the walls surrounding the holes with catalytic ink when the laminate is not porous, or when the catalytic agent is not dispersed throughout, is to dip the flexible panel, provided with apertures at designated points defining cross-overs between the top and bottom surfaces thereof, in the catalytic ink. The panel is then removed from the ink and the excess ink squeeged off the surface of the board. Excess ink may be removed from the holes using air pressure or vacuum. The entire panel may then be permitted to air-dry. The thin film of the catalytic ink which remains on the surface of the board may be readily removed by using a stripper solution, such as xylene, toluene, alcohol (e.g. isopropyl, methyl), and so forth. The surface then becomes saturated with the stripper solution and may readily be wiped clean. The stripping solution coagulates the ink lifting it completely from the surface of the flexible laminate.

In coating the walls surrounding or forming the hole with catalytic ink in this manner, it is usually desirable to dilute the ink with a suitable solvent so that the ink is relatively thin and free flowing.

In another embodiment of the invention, the flexible base material may actually be molded or otherwise prepared from a flexible resinous material which has incorporated therein catalytic particles of the type described above. In this embodiment of the invention, the catalytic particles are dispersed throughout the entire flexible base material. This embodiment is highly analogous to the one wherein a flexible, foraminous or porous material, such as a woven cloth, is impregnated with catalytic ink. In this embodiment also it wil be noted, plated through hole connections may readily be obtained simply by boring holes in the flexible substratum at designated point. The walls of the holes will therefore be active to deposition of electroless metal, or may readily be rendered active.

As will be clear, the techinques described herein are suitable for making printed circuits on one or both sides of a flexible insulating panel, for making through connections in such flexible insulating panels, and for making multilayer circuit boards.

Figure 10:
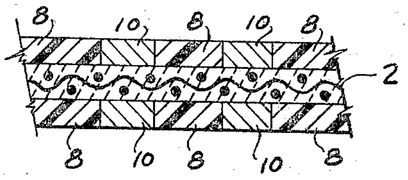
FIGURE 10 is a cross-section of an embodiment of the invention having ductile electroless metal deposited on both surfaces of the flexible base.

FIGURE 10 is illustrative of a two-sided circuit board made by applying the techniques described in FIGURES 1–5 to both sides of a flexible, insulating foraminous web 2.

Figure 11:
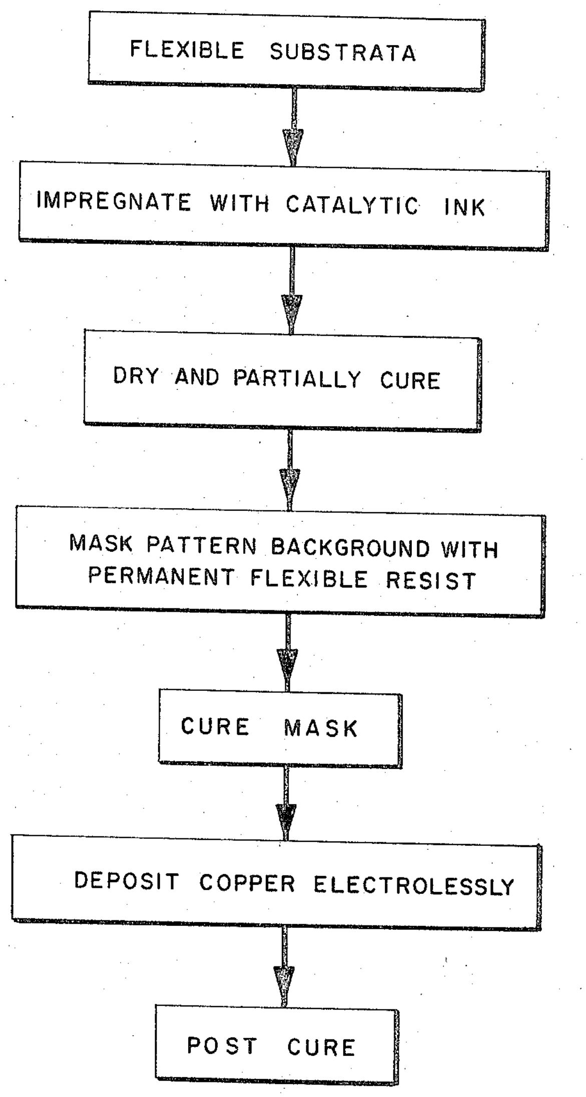
FIGURE 11 is a simplified flow sheet illustrating the typical sequence used in the manufacture of the products of this invention.

The basic steps utilized in making printed circuits by following the teachings contained herein will readily be apparent by reference to FIGURE 11, which is a simplified flow sheet of the process described.

It should be noted that any number of circuit layers prepared as described may be superimposed one upon the other to form multilayer flexible circuits.

Figure 9:
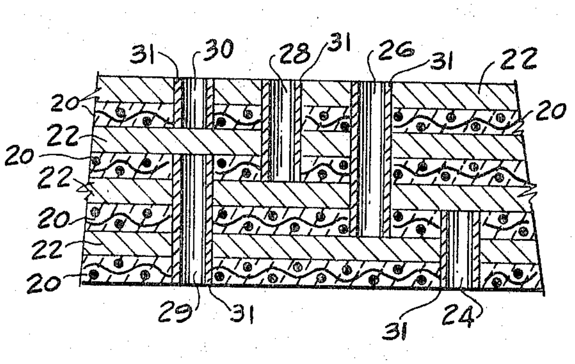

FIGURE 9 depicts a four-layer circuit pattern made in accordance with the teachings contained herein. In FIGURE 9, 20 represents a foraminous insulating material impregnated with the catalytic ink described herein, and 22 indicates areas of electroless copper superimposed on insulating member 20 as described hereinabove.

Holes 24, 26, 28, 29 and 30 provide through connections between various layers of the flexible circuit pattern. The walls surrounding the holes are coated with an electroless copper as indicated at 31.

As will be noted from FIGURE 11, it is desirable in utilizing the catalytic inks described to cure in two stages. Thus, the resin is partially cured following application and prior to electroless metal deposition. Following electroless metal deposition, the resin is post cured to complete the cure.

In the multilayer embodiments of the invention shown in FIGURES 7, 8 and 9, it is desirable to utilized cuprous oxide as the catalytic agent, in order to prevent leakage betwen the printed circuit patterns.

If desired, special properties may be imparted to the copper conducting patterns produced as disclosed herein.

For example, following formation of the conductor pattern, the copper circuit can be dip soldered in whole or in part. If only portions of the circuit are to be dip soldered, a permanent or non-permanent solder mask may be used to coat the conductor pattern prior to dip soldering. Also, if desired, the conducting copper pattern, either in whole or in part, may receive an additional coating of metal, suc has gold, silcer, rhodium, and the like, to impart special properties to the circuit as a whole or designated portions thereof.

Although particularly described with reference to the manufacture of flexible printed circuits, it will be appreciated that the techniques described have broader application and may be utilized whenever it is desired to metallize flexible substrata, such as for ornamentation, masking, and the like.

The invention in its broader aspects is not limited to the specific steps, processes and compositions described but departures may be made therefrom within the scope of the accompanying claims without departing from the principles of the invention and without sacrificing its chief advantages.

What is claimed is:

1. A process for metallizing flexible and foraminous insulating material which comprises impregnating the material with a resinous adhesive having dispersed therein an agent catalytic to the reception of electroless metal, masking a portion of the surface of the impregnated material to leave exposed surface areas, and depositing ductile metal on the exposed surface areas by contacting the impregnated and masked material with an aqueous autocatalytic metal depositing solution capable of electrolessly depositing ductile metal on such areas.

2. The process of claim 1, wherein said ductile deposit of an electroless metal is a ductile deposit of electroless copper.

3. The process of claim 1, wherein the autocatalytic metal depositing solution comprises a water soluble metal salt, a complexing agent for the metal ion of the salt, a reducing agent for the metal ion of the salt, and a water soluble compound which contains cyanide.

4. The process of claim 3, wherein the catalytic agent is finely divided cuprous oxide, and wherein the cuprous oxide is reduced at least in part to copper prior to contact with the electroless metal deposition solution.

5. The process of claim 3, wherein the cyanide containing compound is selected from the group consisting of inorganic cyanide and organic nitriles.

6. The process of claim 3, wherein the reducing agent is selected from the group consisting of formaldehyde, borohydrides, and amine boranes.

7. The process of claim 3, wherein the aqueous electroless metal depositing solution is an electroless copper bath comprising: about 0.002 to 0.60 mole per liter of a water soluble copper salt; about 0.002 to 2.5 moles per liter of a reducing agent; about 0.5 to 10 times the moles of copper of a complexing agent for cupric ion; about 0.00002 to 0.06 mole per liter of water soluble cyanide salt; and enough of an alkali metal hydroxide to give pH of about 10 to 14.

8. The process of claim 1, wherein the resinous adhesive comprises, in combination, a thermosetting resin selected from the group consisting of phenolic resins, polyester resins, rigid epoxy resins, and mixtures thereof, and an adhesive resin selected from the group consisting of flexible epoxy resin, polyvinyl acetal resin, butadiene-acrylonitrile resin, chlorinated rubber, and mixtures thereof.

9. The process of claim 1, which includes establishing apertures in the impregnated foraminous material so as to leave catalytic agent exposed on the walls of the apertures, and depositing ductile metal on the walls of the apertures and the exposed surface areas of the material by immersing the impregnated and masked material in the aqueous autocatalytic metal depositing solution.

10. A method for forming multilayered printed circuits which comprises impregnating a plurality of separate, flexible and foraminous insulating panels with a resinous adhesive having dispersed therein an agent catalytic to the reception of electroless metal, establishing apertures in the impregnated panels so as to leave catalytic agent exposed on the walls of the apertures, masking a portion of the surface of each impregnated panel to leave exposed conductor patterns, depositing ductile metal on the exposed conductor patterns and the walls of the apertures of each panel by contacting each impregnated and masked panel with an electroless metal deposition solution capable of autocatalytically depositing ductile metal, stacking at least two of the resulting flexible panels together, such that the apertures therein are aligned; and subjecting the stacked panels to heat and pressure to bond them together.

11. As a new article of manufacture, a flexible insulating support, a resinous adhesive adhered to the support and having dispersed therein an agent catalytic to the reception of an electroless metal, and a thin ductile deposit of the electroless metal tenaciously adhered to exposed sites of the catalytic agent and to the support, said electroless metal deposit being capable of withstanding bending forces on the flexible support without cracking or breaking its bond to the support.

12. The new article of manufacture of claim 11, wherein the ductile deposit of an electroless metal is a ductile deposit of electroless copper.

13. The new article of manufacture of claim 11, wherein the flexible insulating support comprises a flexible and foraminous insulating material that is impregnated with the resinous adhesive having dispersed therein the catalytic agent.

14. The new article of manufacture of claim 11, wherein the surface of the flexible insulating support is coated with the resinous adhesive having dispersed therein the catalytic agent.

15. The new article of manufacture of claim 11, including apertures in the flexible insulating support, and a thin ductile deposit of an electroless metal tenaciously adhered to exposed sites of the catalytic agent on the walls of the apertures.

16. The new article of manufacture of claim 11, wherein the thin ductile deposit of electroless metal forms conductor patterns to provide a printed circuit panel.

17. The new article of manufacture of claim 11, wherein the flexible insulating support has an upper and a lower surface, and the thin ductile deposit of the electroless metal is tenaciously adhered to both surfaces of the support.

18. The new article of manufacture of claim 17, wherein the thin ductile deposits of electroless metal on both surfaces of the support form conductor patterns to provide a two-sided printed circuit panel.

19. As a new article of manufacture, a flexible molded resin base having dispersed throughout an agent catalytic to the reception of an electroless metal and a thin ductile deposit of the electroless metal tenaciously adhered to exposed sites of the catalytic agent and to the base, said electroless metal deposit being capable of withstanding bending forces on the resin base without cracking or breaking its bond to the base.

References Cited

UNITED STATES PATENTS

| | | | |
|---|---|---|---|
| 2,907,925 | 10/1959 | Parsons | 317—101 |
| 3,006,819 | 10/1961 | Wilson et al. | 204—15 |
| 3,167,490 | 1/1965 | Friedman | 204—15 |
| 3,222,218 | 12/1965 | Beltzer et al. | 117—47 |
| 3,257,215 | 6/1966 | Schneble et al. | 106—1 |
| 3,259,559 | 7/1966 | Schneble et al. | 204—38 |

EARL M. BERGERT, *Primary Examiner.*

M. L. KATZ, *Assistant Examiner.*